(12) United States Patent
Covell et al.

(10) Patent No.: US 8,238,669 B2
(45) Date of Patent: Aug. 7, 2012

(54) DETECTION AND CLASSIFICATION OF MATCHES BETWEEN TIME-BASED MEDIA

(75) Inventors: Michele Covell, Palo Alto, CA (US);
Jay Yagnik, Mountin View, CA (US);
Jeff Faust, San Jose, CA (US); Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 976 days.

(21) Appl. No.: 12/174,366

(22) Filed: Jul. 16, 2008

(65) Prior Publication Data

US 2009/0052784 A1    Feb. 26, 2009

Related U.S. Application Data

(60) Provisional application No. 60/957,446, filed on Aug. 22, 2007.

(51) Int. Cl.
*G06K 9/62* (2006.01)
*H04N 7/10* (2006.01)
*H04N 7/025* (2006.01)

(52) U.S. Cl. ........ 382/224; 382/181; 707/711; 707/737; 707/741; 707/752; 725/32

(58) Field of Classification Search ................ 382/181, 382/224; 707/711, 737, 741, 752; 725/19, 725/32

See application file for complete search history.

(56) References Cited

U.S. PATENT DOCUMENTS 5,973,723 A * 10/1999 DeLuca ........................ 725/34
7,043,473 B1    5/2006 Rassool et al.
2006/0271947 A1  11/2006 Lienhart et al.
2007/0071330 A1    3/2007 Oostveen et al.

OTHER PUBLICATIONS

Shumeet Baluja et al., *Audio Fingerprinting: Combining Computer Vision & Data Stream Processing*, IEEE International Conference on Acoustics, Speech and Signal Processing (ICASSP 2007), Apr. 15-20, 2007, pp. II-213-II-216, vol. 2.
Shumeet Baluja et al., *Content Fingerprinting Using Wavelets*, 3rd European Conference on Visual Media Production, 2006, pp. 198-207.
Ondrej Chum et al., *Scalable Near Identical Image and Shot Detection*, Conference on Image and Audio Video Retrieval, Proceedings of the 6th ACM International Conference on Image and Video Retrieval, 2007, pp. 549-556, ACM. N.Y., USA.
Edith Cohen et al., *Finding Interesting Associations without Support Pruning*, IEEE Transactions on Knowledge and Data Engineering, 2001, pp. 64-78, vol. 13, Issue 1.

(Continued)

*Primary Examiner* — John Strege
(74) *Attorney, Agent, or Firm* — Fenwick & West LLP

(57) ABSTRACT

A system and method detects matches between portions of video content. A matching module receives an input video fingerprint representing an input video and a set of reference fingerprints representing reference videos in a reference database. The matching module compares the reference fingerprints and input fingerprints to generate a list of candidate segments from the reference video set. Each candidate segment comprises a time-localized portion of a reference video that potentially matches the input video. A classifier is applied to each of the candidate segments to classify the segment as a matching segment or a non-matching segment. A result is then outputted identifying a matching portion of a reference video from the reference video set based on the segments classified as matches.

30 Claims, 12 Drawing Sheets

OTHER PUBLICATIONS

Michele Covell et al., *Known-Audio Detection Using Waveprint: Spectrogram Fingerprinting by Wavelet Hashing*, International Conference on Acoustics, Speech and Signal Processing (ICASSP-2007), 2007.

Charles E. Jacobs et al., *Fast Multiresolution Image Querying*, International Conference on Computer Graphics and Interactive Techniques, Proceedings of the 22nd Annual Conference on Computer Graphics and Interactive Techniques, 1995, pp. 277-286, ACM, U.S.A.

Ting Liu et al., *Clustering Billions of Images with Large Scale Nearest Neighbor Search*, 8th IEEE Workshop on Application of Computer Vision (WACV'07). Feb. 2007, pp. 28-34, U.S.A.

Pierre Moulin et al., *Performance of Random Fingerprinting Codes Under Arbitrary Nonlinear Attacks*, IEEE International Conference on Acoustics Speech and Signal Processing, Apr. 2007, pp. II-157-II-160, vol. 2, Issue 15-20.

Ashwin Swaminathan et al., *Robust and Secure Image Hashing*, IEEE Transactions on Information Forensics and Security, Jun. 2006, pp. 215-230, vol. 1, No. 2.

PCT International Search Report and Written Opinion, PCT/US2008/074105, Nov. 4, 2008, 9 Pages.

First Office Action for Chinese Patent Application No. CN 200880110557.3 mailed Oct. 10, 2011, 6 pages.

Examiner's First Report on Australian Patent Application No. AU 2008288797, Jun. 12, 2012, 2 Pages.

* cited by examiner

DETECTION AND CLASSIFICATION OF MATCHES BETWEEN TIME-BASED MEDIA

CROSS REFERENCE TO RELATED APPLICATIONS

This application claims the benefit of U.S. Provisional Application No. 60/957,446 entitled "Fast and Accurate Detection and Classification of Matches Between Time-Based Media" filed on Aug. 22, 2007, herein incorporated by reference.

BACKGROUND

1. Field of Art

The invention generally relates to video processing, and more specifically to detecting matching video content.

2. Description of the Related Art

Electronic video libraries may contain thousands or millions of video files, making management of these libraries an extremely challenging task. Video hosting sites need a mechanism for identifying unauthorized videos. While some files may be identified by file name or other information provided by the user, this identification information may be incorrect or insufficient to correctly identify the video. An alternate approach of using humans to manually identifying video content is expensive and time consuming.

Another problem faced by video sharing sites is that the site may contain multiple copies of the same video content. This wastes storage space and becomes a significant expense to the host. A third problem is that due to the large number of files, it is very difficult to organize the video library in a manner convenient for the users. For example, search results may have multiple copies of the same or very similar videos making the results difficult to navigate for a user.

In view of the problems described above, a technique is needed for automatically comparing and matching videos with overlapping video content.

SUMMARY

A system and method detects duplicate video content. A matching module receives an input video fingerprint representing an input video. The matching module generates a list of candidate segments from a reference video set. Each candidate segment comprises a time-localized portion of a reference video in the reference video set. A classifier is applied to each of the candidate segments to classify the segment as a matching segment or a non-matching segment. A result is then produced that identifies a matching portion of a reference video from the reference video set based on the segments classified as matches.

In one embodiment, candidate segments are determined by obtaining reference fingerprints representing the reference videos in the reference video set and identifying partial matches between the input fingerprint and the reference fingerprints. A set of initial candidate reference videos are then determined based on the identified partial matches. The initial candidate reference videos are analyzed to determine temporally consecutive matches between segments of the input video and segments of the reference video. The candidate segments are then selected based on temporally consecutive matches.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system and method is described for determining if an input media file (e.g., either video or audio or both) matches or partially matches a reference media file in a reference set of media files (e.g., a database of video and/or audio clips). The match detection process can detect matches between portions of a media file (e.g., a 20 second clip) even if the media files do not have the same start and end points or when content occurring before or after the matching portion are different. Furthermore, the process is robust enough to withstand the standard degradations that occur with low-quality transcoding and is robust to some amount of time-scale modification (e.g., playing a video back faster or slower). The process is able to correctly classify both "true positives" (where one or more matching media file are in the database) and "true negatives" (where there are no corresponding matches in the database). Often, the process can detect matches under tight time constraints (to handle the upload traffic rate) and/or using a limited amount of memory.

Figure 1:
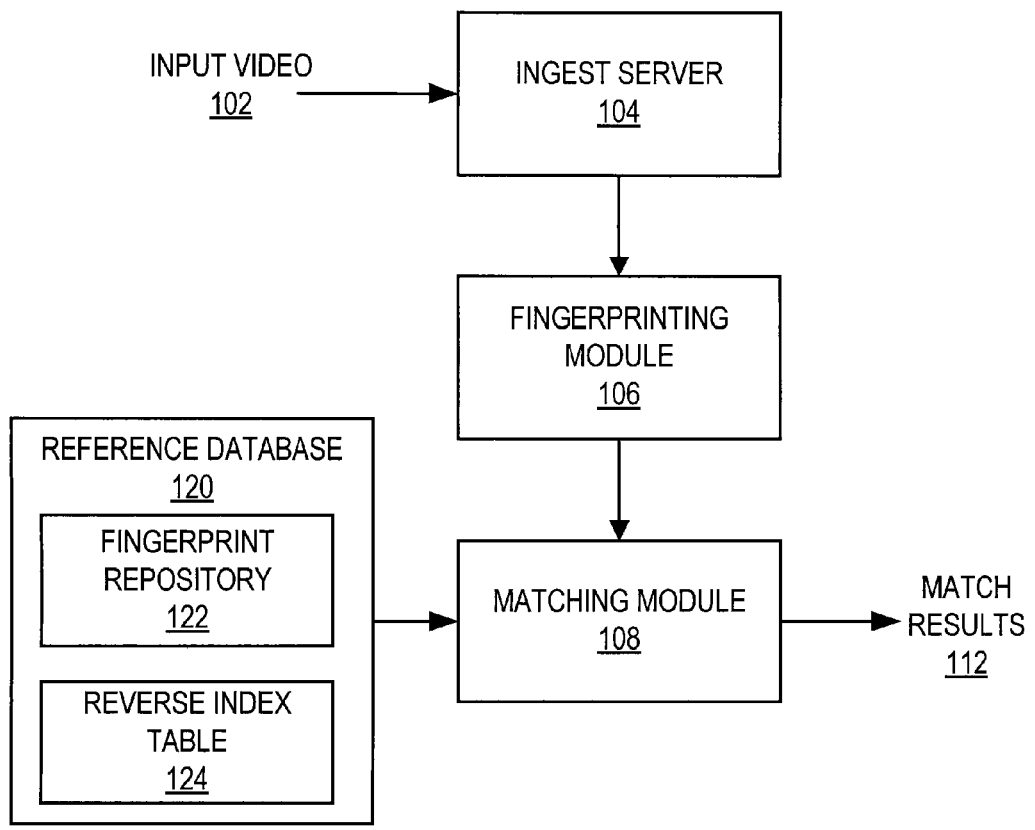
FIG. 1 is an embodiment of a system for detecting matches between an input video and a set of reference videos.

An embodiment of a system for detecting matches between time-based media is illustrated in FIG. 1. It is noted that, although specific examples are provided in the context of matching video content, the described system and method can be used for other types of media content matching such as audio, images, etc. An ingest server 104 receives an input video 102 from a video source. The video source can be, for example, a client computer that communicates with the ingest server 104 through a network. Alternatively, the video source can be a database or other storage device communicatively coupled to the ingest server 104. For example, the video source can be a video storage medium such as a DVD, CD-ROM, Digital Video Recorder (DVR), hard drive, Flash memory, or other memory. The ingest server 104 may also be communicatively coupled to a video capture system such as a video camera, to receive live video content.

The fingerprinting module 106 receives the input video 102 from the ingest server 104 and generates a "fingerprint" representing the input video 102. The fingerprint is a bit vector representing, for example, the spatial, temporal, and/or structural characteristics of some or all of the video files in a compact format. The fingerprint identifies a video based on its visual content such that minor variations due to compression, de-compression, noise, frame rate, start and stop time, source resolutions and so on do not significantly affect the fingerprint.

In one embodiment, the fingerprinting module 106 divides the received video into multiple overlapping segments and a sub-fingerprint is generated for each segment. A segment is preferably 0.5 to 5.0 seconds in length, though segments of other lengths may be used. Thus, each sub-fingerprint represents a time-localized segment of the media (e.g., 4 sec of video or 1.5 sec of audio). The start times of the segments are typically spaced at a fixed frequency (e.g., once each 0.25 seconds for video, or once each 0.10 seconds for audio). For example, a first sub-fingerprint is computed on the segment of a video from 0 to 4 seconds, a second sub-fingerprint is computed on the segment from 0.25 to 4.25 seconds, a third sub-fingerprint is computed for the segment from 0.50 to 4.50 seconds, and so on. Each sub-fingerprint is referenced by a sub-fingerprint identifier code that identifies the particular segment of a video represented by the sub-fingerprint. For example, the sub-fingerprint identifier code may include a (video, offset) pair. The "video" portion of the identifier uniquely identifies a video in the reference video database (e.g., using a 32 bit identifier). The "offset" portion of the identifier identifies a particular segment (or corresponding sub-fingerprint) of the video by, for example, an offset index referencing the start time of the segment. For example, if the start times of the segments are space 0.25 seconds apart, the segment starting at 0 seconds may have an offset index of 0, the segment starting at 0.25 seconds may have an offset index of 1, the segment starting at 0.5 seconds may have an offset index of 2, and so on. The segments can also be identified by their start times directly. The complete ordered sequence of sub-fingerprints provides the full fingerprint for the video.

In one embodiment, each sub-fingerprint comprises a vector of values, with each value taking on a non-ordered value from a limited size alphabet (e.g., 256-sized alphabet, encoded into a single byte per vector dimension but without ordinality). For example, each value may be encoded based on a probability distribution of the values using an entropy encoding. The extension to metric spaces is made by replacing Hamming distance metrics by the distance metric appropriate for the space from which the sub-fingerprint is taken. The generalization to non-uniformly sampled (fingerprinted) sequences will be apparent to one of ordinary skill in the art. For clarity, this description will assume uniform sampling and will assume non-ordered alphabets using Hamming metrics for comparison.

The matching module 108 compares the fingerprint of an input video 102 to some set of reference fingerprints representing the set of reference videos. The reference fingerprints may be for all available reference videos, or a subset thereof. In some cases, fingerprints are provided from a fingerprint source without providing the initial reference videos on which the fingerprints are based. The matching module 108 outputs match results 112 identifying one or more reference videos (or portions of reference videos) that match at least a portion of the input video 102. A method for determining matches is described in more detail below with reference to FIG. 3.

The reference database 120 includes one or more fingerprint repositories 122 and one or more reverse index tables 124. The fingerprint repositories 122 store fingerprints of the reference videos. Each sub-fingerprint in the set of reference fingerprints is identified by a sub-fingerprint identifier identifying the particular video and offset into the video corresponding to the video segment represented by the sub-fingerprint. The offset can be a time offset for the beginning time value of the segment, or an index number indicating the position in the sequence of segments.

In one embodiment, fingerprints for some reference videos may be marked with additional metadata in the fingerprint repository 122, such as an indication that the reference video contains "premium content." Videos marked as "premium content" are those that deserve an increased level of protection and are given special consideration during the matching process as will be described below. Premium content designation can be determined according to a number of different factors. In one embodiment, content owners determine which content to designate as premium content. For example a media company may select some number of "top" videos from among the ones they own as being the ones for which they have the highest concern. In another embodiment, the designation of premium content can be determined based on previous match history. For example, a reference video that has previously been determined to have matching content with a subsequently uploaded input video may be automatically designated as premium content. In another embodiment, the designation of premium content is based on the length of time that the reference video has been in the reference repository. For example, a reference can be treated as premium for the first month that it is in the database and then optionally have its designation as premium content removed. Furthermore, the designation of premium content can be multi-level. For example, different levels of premium content can be designated, corresponding to different levels of analysis.

In one embodiment, a separate fingerprint is generated for each media track (e.g., audio or video) of the reference videos. Furthermore, in some embodiments, multiple fingerprints may be generated for each media track. For example, if the fingerprint generation process is sensitive to left-right mirroring, the process may choose to generate two fingerprint sequences for each video track (the second running the fingerprinting process on the mirrored frames, where there has been a left/right flip in the frames of the video before fingerprinting). The number of fingerprints generated for each track (and the types of transformations applied) may be dependent on meta-data associated with the reference video and on whether or not the reference video is marked as "premium content". As another example, a video may have multiple audio tracks corresponding to different channels, in which case each audio track may have a fingerprint, or alternatively only selected audio tracks (e.g., stereo left and stereo right) may have a fingerprint.

When multiple fingerprints are generated for a single track, the sub-fingerprints are added to the fingerprint repository 122 under the same sub-fingerprint identifier codes together with an identifier code for the media type (e.g., audio or video) and distinct sub-codes to unambiguously distinguish between multiple fingerprints. For simplicity in the description that follows, it assumed that fingerprints for each type of track (e.g. audio and video) are stored in a separate fingerprint repository 122. Also for simplicity, the described example case assumes each reference video has only one video track and one audio track and has a single fingerprint for each track.

In one embodiment, a reverse index table 124 is created based on the contents of the fingerprint repository 122. If the repository 122 is periodically updated (e.g., when a user uploads a new video), the reverse index table 124 may be updated at scheduled intervals, or whenever the repository contents change. In the reverse-index table 124, a subset of sub-fingerprint values (or "sub-fingerprint key") provide a means to identify reference sub-fingerprint in the repository table 122. Each sub-fingerprint key is stored in association with the set of reference sub-fingerprints containing that sub-fingerprint key. This reverse index 124 is structured to provide approximate nearest neighbor functionality.

Figure 2:
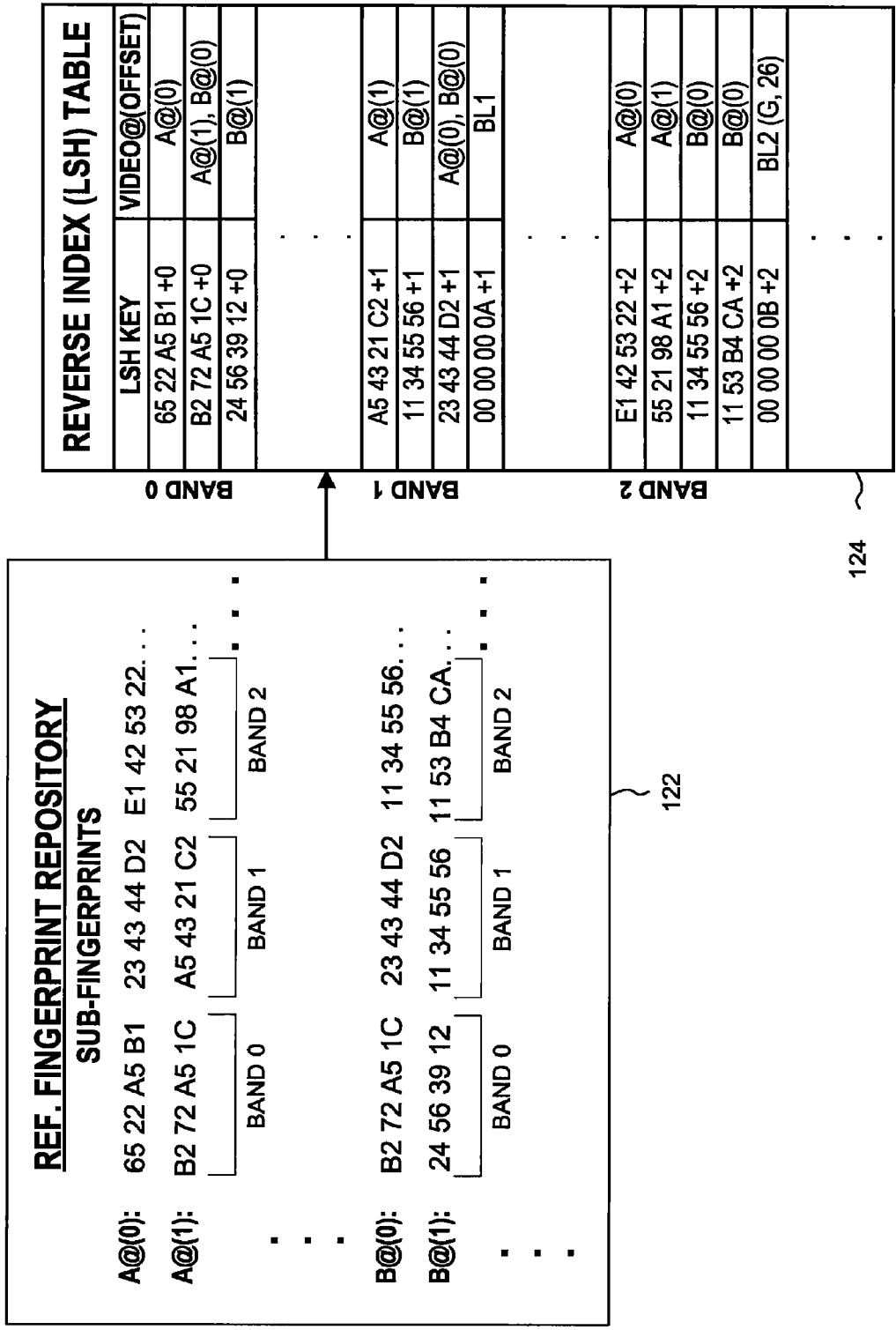
FIG. 2 is an embodiment of a reference database for matching reference videos to an input video.

An example of a reference fingerprint repository 122 and reverse index table 124 using location-sensitive hashing (LSH) is illustrated in FIG. 2. A set of reference sub-fingerprint correspond to reference videos in the reference repository 122. Each sub-fingerprint is associated with a segment of a video and identified using the notation X@(Y), where X is the identifier of a video, and Y is an offset index identifying the segment of video X The set of sub-fingerprints $(X@(Y_1) \ldots X@(Y_n))$ form the fingerprint for video X. For example, in FIG. 2 a fingerprint for reference video A comprises sub-fingerprints A@(0), A@(1), . . . etc. Each sub-fingerprint corresponds to a segment of reference video A the segments are identified by an offset index. For example, A@(0) identifies a sub-fingerprint representing the segment of video A at an offset index 0, A@(1) identifies a sub-fingerprint representing the segment of video A at an offset index of 1, and so on.

Each sub-fingerprint comprises a sequence of values (e.g., each value may be a byte). The sequence of values is divided into a number of LSH bands with each band corresponding to a subset of values in the sub-fingerprint. For example, LSH band 0 comprises the first four values of the sub-fingerprint, LSH band 1 comprises the next four values of the sub-fingerprint and so on. In one embodiment, a sub-fingerprint has 25 LSH bands, each comprising four byte values. The set of values in the LSH bands of a sub-fingerprint correspond to the LSH band keys for that sub-fingerprint as mentioned above, and is stored in the reverse index table 124 in association with the sub-fingerprint identifiers that include the key. Each sub-fingerprint band key is also referred to herein as an "LSH key."

For example, sub-fingerprint A@(0) has the values (65, 22, A5, B1) in LSH band 0. This set of values is represented in the reverse index LSH table 124 by the LSH key (65 22 A5 B1+0). In this notation, the +0 indicates that key is found in the LSH band 0. The LSH table 124 maps each LSH key to each sub-fingerprint in the repository 122 that contains the LSH key. For example, the table stores identifiers for the sub-fingerprints A@(0) and B@(0) in association with the LSH key 234344D2+1 because each of the sub-fingerprints contains the values (23 43 44 D2) in LSH band 1. Note that the values (11 34 55 56) appear in band 2 of sub-fingerprint B@(0) and band 1 of sub-fingerprint B@(1). However, these are considered different LSH keys, and thus indexed separately in the reverse index table 124, because the sequences of values are in different LSH bands.

In an alternative embodiment, the LSH bands comprise disjoint (non-adjacent) subsets of values rather than consecutive values as illustrated. The grouping of values into LSH bands depends on the constraints of the specific application. Another alternative approach uses LSH keys that are derived from full sub-fingerprints. For example, an LSH key for a sub-fingerprint can be determined by computing the sign bit codes from multiple projections onto random-but-memorized dividing planes, from short sequences of sub-fingerprints, or such as the frequency histogram of the sub-fingerprint entry values within a short support window. The frequency histogram approach could use fixed-bin frequency counts as the key or it could use the value of the most frequent signature values in that time interval as the key.

In other alternative embodiments, nearest neighbor functionality is provided using a technique different than LSH such as, for example, spill trees and M trees, using the Hamming distance measured at the sub-fingerprint vector level as its metric space. In the description that follows, the reverse index is referred to as the LSH tables, even though there is no requirement that the approximate nearest neighbor functionality is provided by that specific data structure.

In this embodiment, the reverse index tables 124 is selectively modified for common LSH keys in order to control the amount of memory and computation used in the matching process. Specifically, the table is structured to mark LSH keys that have a reduced likelihood of being useful to discriminate between sub-fingerprints. This status is determined by various tests on the frequency and/or distribution of each LSH key within the reference fingerprint.

A first test is based on the frequency of occurrence of an LSH key. If more than a pre-defined percentage of the total number of reference videos contain a given LSH key in their fingerprint, then that LSH key is identified in the LSH table 124 as a "first-level blacklisted" key, and the sub-fingerprint identifiers containing that key are omitted from the table 124. Instead, a special identifier code indicating a first level blacklisted key is stored in association with the key in the reverse index table 124. For example, in one embodiment, if more than 5% of the reference videos contain the key (00 00 00 0A+1), then the key is identified as a first-level blacklisted key in the reverse index table 124 (by storing a special identifier code, such as "BL1", in association with the key) and no sub-fingerprint identifiers are stored in association with that key.

If criteria for the first-level-blacklist is not met, but if the total number of sub-fingerprints that contain a given LSH key is still above a threshold, then the LSH key is marked in the reverse index table 124 in a distinctive way as being a "second-level blacklisted" key. For example, if more than 10,000 reference sub-fingerprints contain key (00 00 00 0B+2) but these 10,000 reference sub-fingerprints are al contained within only 1% of the reference videos, then a special identifier indicating a "second-level blacklist" is stored in association with the key. In one embodiment, the full list of sub-fingerprint identifiers that contain the second-level blacklisted keys is not stored. Instead, the LSH table 124 stores only a list of videos identifiers but not the offset index (i.e. the particular segments are not identified). In addition, the table may store a count of the number of sub-fingerprints in each video that contain the matching key. For example, in the table 124, key (00 00 00 0B+2) is identified as a second-level blacklisted key and a special identifier code, such as "BL2", is stored in association with the key. The code (G, 6) is also stored in association with the key, indicating that the fingerprint for a video "G" has 26 different sub-fingerprints that contain the matching key (00 00 00 0B+2). The individual sub-fingerprint identifiers for the sub-fingerprints containing the matching key are not individually stored.

Additional LSH tables without blacklisting may be used to provide additional indexing for reference videos marked as premium content. These tables only contain those LSH keys that have been blacklisted at some level in the primary LSH tables and only include references videos marked as premium content. In addition, these tables might also include sparse indices to reference video segments that would otherwise wind up being completely missing from the reverse index, due to blacklisting. In one embodiment, the sparse indices guarantee that all reference videos have a non-blacklisted reverse-index entry at least once per critical time interval (for example, at spacing of no more than 20 seconds apart). The entries from these tables are added to the matching process, described below, as if they came from the primary set of LSH tables.

Fingerprint Matching

Figure 3:
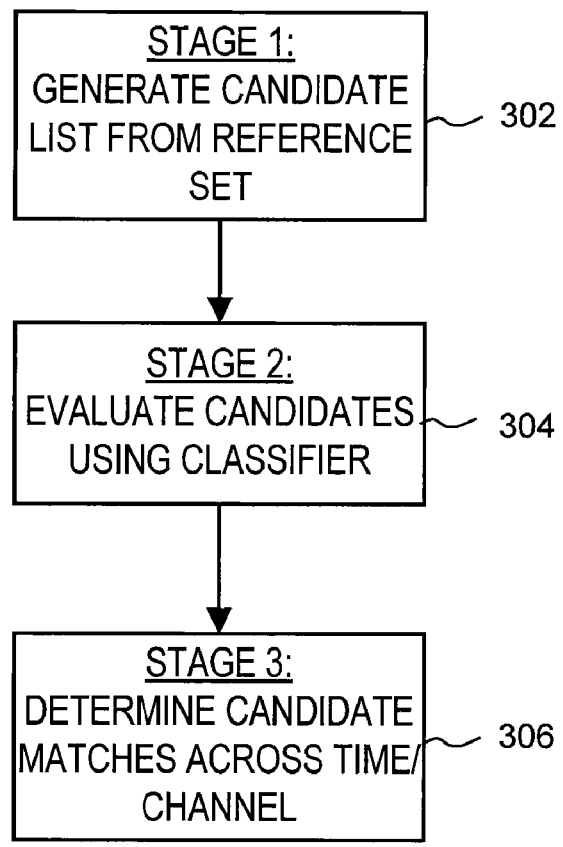
FIG. 3 is an embodiment of a process for detecting matching video content.

When an input video 102 is received for matching (e.g., from uploaded content or from an existing database of videos), the input video 102 is fingerprinted according to the same fingerprinting process applied to the reference videos. The matching module 108 then determines which portions of the input video 102 (if any) match against portions of reference videos in the reference database 120. In one embodiment, the matching module 108 determines matches according to a three-stage process as illustrated in FIG. 3. In stage 1, the matching module 108 generates 302 a candidate list of candidate matches for the input video 102 from the reference set. Each entry in the candidate list indicates: (1) the portion(s) of the input video that potentially match the candidate; (2) the video identifier for the candidate reference match; and (3) the portion(s) of the reference video that potentially match the input video. For example, a candidate list may include results such as those indicated in the table below:

| Reference Video ID | Portion of Input Video Match | | Portion of Reference Video Match | |
| --- | --- | --- | --- | --- |
| | Start Time | End Time | Start Time | End Time |
| A | 2.4 seconds | 12.4 seconds | 61.9 seconds | 71.9 seconds |
| F | 32.1 seconds | 37.6 seconds | 93.5 seconds | 99.0 seconds |
| T | 11.3 seconds | 31.3 seconds | 55.3 seconds | 75.3 seconds |

In a second stage, each candidate entry in the candidate list is further evaluated 304 to provide a local classification indicating whether the match is correct or spurious. This determination is based on evidence from within the matching portions indicated in the candidate list.

In a third stage, remaining candidate matches are combined and pruned to determine 306 matches across time and optionally across channels (e.g., audio and video) to provide a final result set. Each of the stages of the three-stage matching process is described in more detail below.

In one embodiment, if the input video 102 is long (e.g., more than 30 minutes), the input video is optionally pre-processed to split the input video up into manageable sized "chapters" (e.g. 32 minutes). Typically, the start and end times of the chapter are defined so that there is some small amount of overlap (e.g., 2 minutes at each end) between the chapters. In a post-processing step, the final output results are "stitched" back together. For the sake of example, the description below assumes the input video is of a manageable duration (e.g., less than 30-32 minutes).

Stage 1: Candidate List Generation

Figure 4:
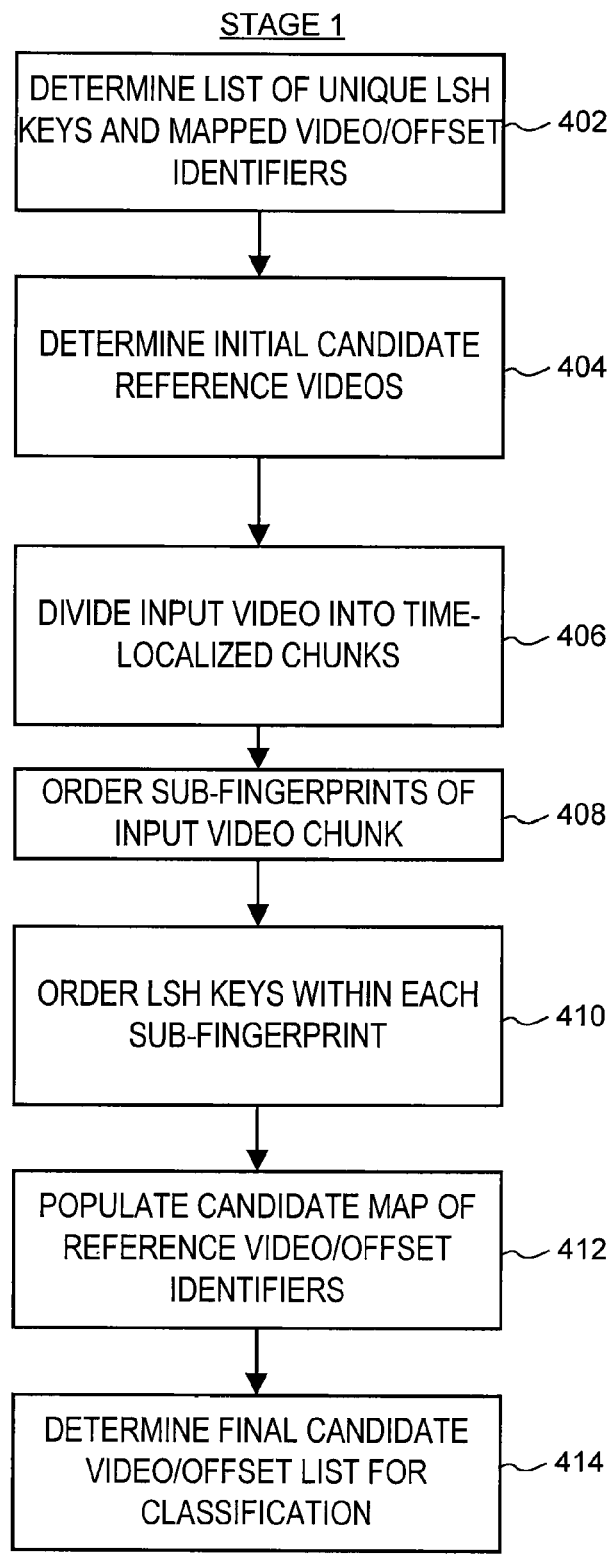
FIG. 4 is an embodiment of a process for generating a list of candidate video segments for potential matches with an input video.

This stage creates a short list of reference segments from the reference set for further consideration. This step is helpful in controlling computation and memory usage and provides a way to insulate the match processing from the total database size and, instead, have the computation grow only as fast as the maximum expected number of true matching entries (e.g. 30-60 entries). An example process for stage 1 is illustrated in FIG. 4.

Figure 5:
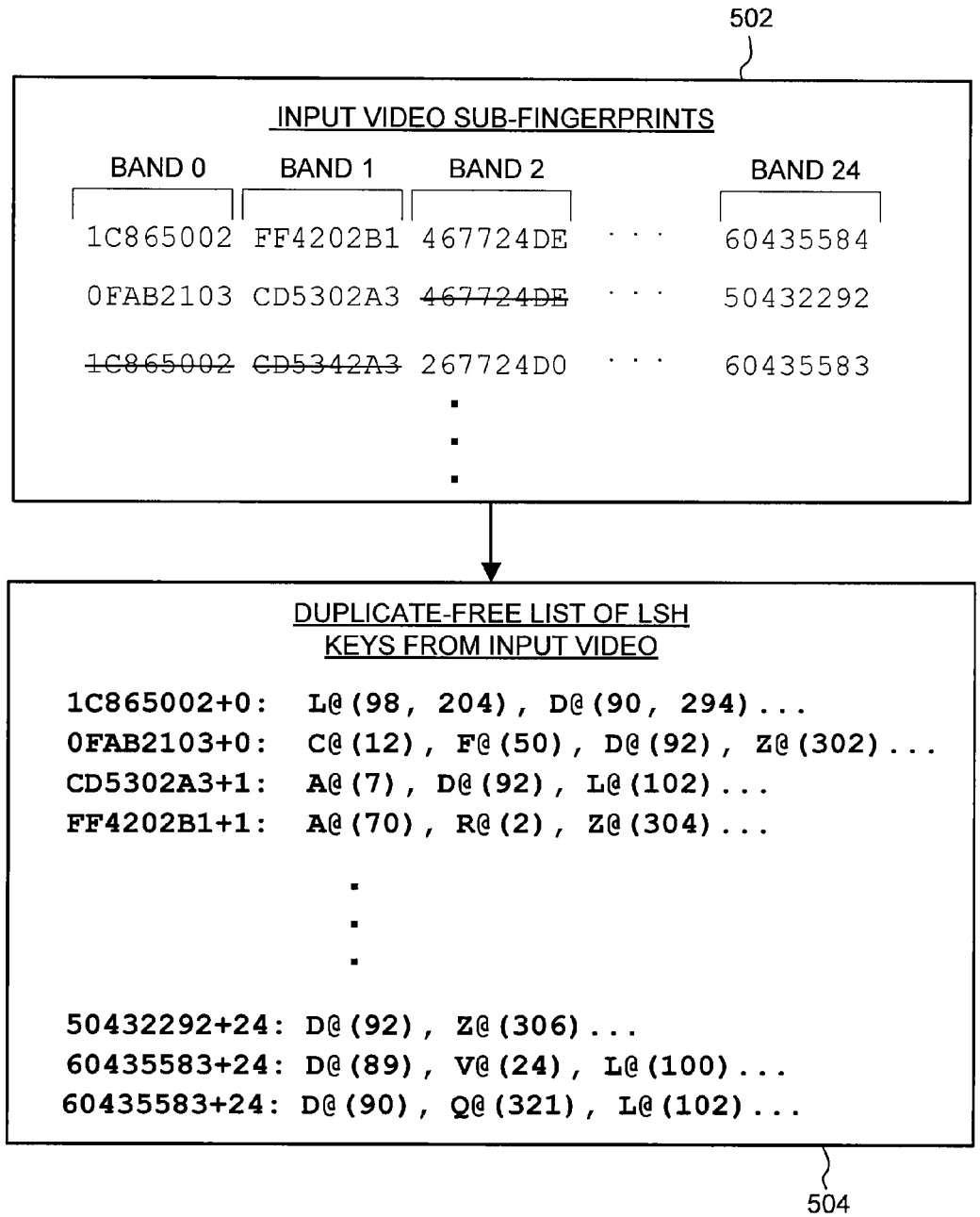
FIG. 5 is an embodiment of table illustrating a duplicate-free list of LSH keys generated for an input video.

The first step is to determine 402 a list of the LSH keys that are present anywhere in the entire sequence of input sub-fingerprints representing the input video 102 and the corresponding reference sub-fingerprint identifiers mapped to those keys in the reverse index table 124. An example embodiment of this step 402 is illustrated in FIG. 5. Each of the input video sub-fingerprints 502 are divided into 25 LSH bands, each containing keys of 4 byte values. In one embodiment, duplicate keys within the same LSH bands are removed as illustrated. Note that keys in different LSH bands are not considered to be duplicates even if the keys contain the same values. Reference sub-fingerprint identifiers are then retrieved from the LSH table 124 corresponding to each of the unique LSH keys in the set of input video sub-fingerprints. The output of the step is a duplicate free list 504 of LSH keys and each of the reference sub-fingerprint identifiers mapped to the LSH keys in the LSH table 124. Here, the notation $Z@(X_1, X_2, X_3 \ldots X_n)$ means that the key is found in video Z at time offset indices $X_1, X_2, X_3 \ldots X_n$. If any of the keys result in a first-level blacklist or a second-level blacklist, this is noted in the duplicate free list 504.

Figure 6:
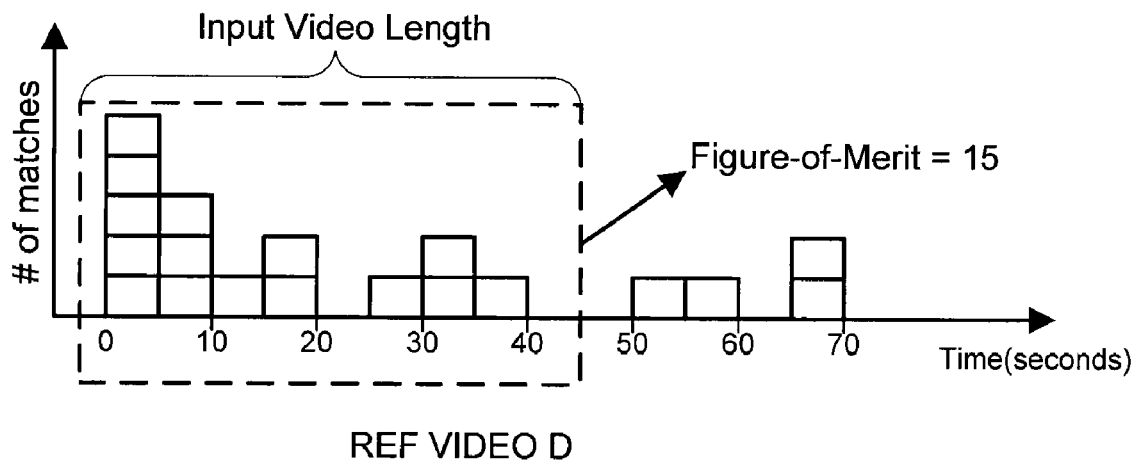
FIG. 6 illustrates an embodiment of a technique for determining a figure of merit for a reference video based on partial matches with an input video.

Next, a list of initial candidate videos for further consideration is determined 404. In one embodiment, the list of initial candidate videos is created by mapping out the general temporal locations of the sub-fingerprints in the duplicate-free list 504 described above, and maintaining a count of the number of LSH keys that are associated with each portion of the video. A time-dependent match count can then be created for each reference video that records a frequency of matches between the reference video sub-fingerprint keys and the input video sub-fingerprint keys during different time windows of each reference video. For example, FIG. 6 illustrates a histogram for a reference video D. (Of course, in practice, the time-dependent match-count is simply stored in memory, and need not be displayed or otherwise presented in any manner). In the illustrated example, the match-count function is coarsely quantized (e.g., to a resolution of 5 seconds). Thus, the match-count function maintains a count of the number of matching keys between the reference video and the input video that occur within each 5 seconds window of the reference video. For example, there are 5 instances of sub-fingerprint keys from reference video D in the time window between 0 and 5 seconds that match a key in the duplicate free list 504 of keys from the input video. There are 3 instances of matches in the time window between 5-10 seconds of the reference video, 1 instance of a match in the time window between 10-15 seconds, and so on.

A figure of merit is then obtained for each reference video based on the match counts. The process then selects a number of videos from the top of this figure-of-merit-ordered list to be the only ones considered in future processing. In one embodiment, the figure of merit is obtained by summing the match counts over the length of the input video, where the start and end points are chosen to maximize the figure-of-merit. For example, in reference video D, the total number of matches are summed for the length of the input video (45 seconds)

between 0 seconds and 45 seconds to obtain a figure-of-merit of 15. This can be implemented as a convolution of the match distribution with the length of the input video, followed by a maximal-value selection:

$$\max_{\{t'\}} \sum_{t'=0}^{L} h(t-t')$$

where L is the length of the input video (e.g., 45 sec) and h(t) is the match count over time. Alternatively, the computation is modified to ensure that each quantized window of the reference video (e.g., 5 second windows) has at least some threshold of matches before it contributes to the figure of merit and that at least a plurality of sections (e.g. 3 five-minute sections) have non-zero contributions. In another embodiment, occurrence rates are also counted for second-level blacklisting of each reference video. Of those references with second-level blacklisting, the counted number of omitted offset identifiers can be taken as being spread uniformly across the range of indices that occur in non-blacklisted scanned LSH lists. This would in effect lower the threshold for those entries to be allowed to provide a non-zero contribution. In yet another embodiment, some additional priority is given to the reference videos that are marked as including premium content. For example, the thresholds to add these entries to the initial candidate video list could be lowered (based on their designation as premium).

Another alternative approach in creating the list of in initial candidate videos is to give additional priority to references which have already been observed to have matched on a previously examined channel (e.g., another audio track). For example, if the process has already completed a pass through the audio channel matching for an input media file and is now examining the video channel, the process can make it easier for the same references to be added to the video channel candidate list. The audio and video channels are often paired (or at least selected from small groups of alternates), so if it is reasonable to assume that the audio channels match a given reference, then the process can be configured to more closely examine the possibility that the video channels also match. The logic that is used for this cross-channel boosting depends on the constraints of the matching process. If the constraints are not too stringent, all references that were matched on a different channel can simply be added to the initial candidate video list. If the constraints do not allow that simple approach, previous matches can be used to lower the thresholds used in creating the initial candidate video list. These thresholds can be lowered either across the full duration of the previously matched entry or they can be lowered only over the synchronized portion of the current track.

All subsequent processing will only consider reference videos that are part of the initial candidate reference video list. Next the input video is divided 406 into time-localized chunks. In one embodiment, the length of the chunk is, at most, half of the length of the shortest expected true match that must be detected. For example, to detect matches as short as 20 seconds long, the chunks could be 10 seconds or less. These chunks can be formed from arbitrarily slicing the input video into non-overlapping 10 second chunks or by slicing the input video into overlapping 10 second chunks (e.g., by sliding a 10 second window across the full input video length). Alternatively, the chunks can be formed from boundaries determined using video or audio analysis (e.g. cut boundaries or high motion boundaries, filled in with evenly spaced boundaries when the analysis-based boundaries are too widely spread). For simplicity of description, the presented examples uses arbitrarily sliced non-overlapping 10 second chunks.

Figure 7:
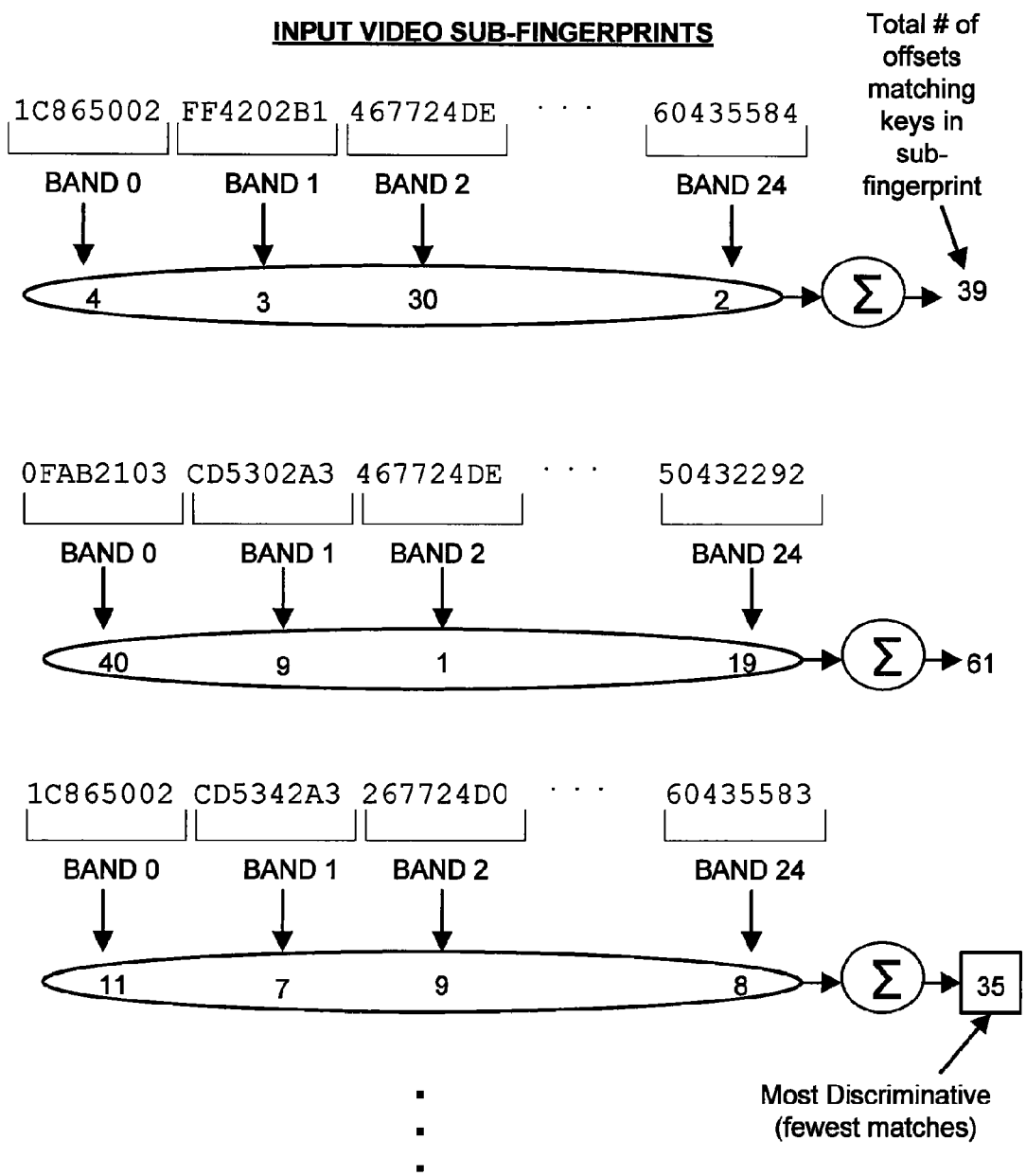
FIG. 7 illustrates an embodiment of a technique for ordering input video sub-fingerprints.

The restriction to only consider the initial candidate video list determined above, can be implemented by pre-populating a map (e.g. a hash map) of initial candidate videos (e.g., videos from the above described pre-selection process) with the initial candidate video list and disallowing further additions of other reference videos to that map Each chunk of the input video is separately processed as described below. In one embodiment, sub-fingerprints of the currently processed chunk of the input video are sorted to determine which sub-fingerprints will be processed first. In one embodiment, the sub-fingerprints are sorted so that the list of sub-fingerprints in the current chunk are ordered 408 from most discriminative to least discriminative. In this embodiment, the total number of reference sub-fingerprints from the initial candidate video list that have matching keys with each input video sub-fingerprint are counted. The sub-fingerprint with the fewest matches is listed first. For example, FIG. 7 illustrates a set of sub-fingerprints from the input video chunk currently being processed. The number of matches is shown for each LSH key in each input sub-fingerprint. For example, the LSH key 1C865002+0 has matches with 4 reference sub-fingerprints from the videos in the initial candidate video list. The number of matches is summed for each input sub-fingerprint. The sums are used to order the input sub-fingerprints from fewest matches (most discriminative) to most matches (least discriminative).

If one or more of the LSH keys in an input sub-fingerprint was subject to second-level blacklisting, then the sum of the number of matching candidates for the sub-fingerprint (summed across the videos in the LSH key list or, alternately, across the candidate videos) is used for that portion of the sub-fingerprint. If one or more of the LSH keys in a sub-fingerprint was subject to first-level blacklisting, then some large value is used for the number of candidate reference sub-fingerprints that the input sub-fingerprint implicates (e.g., 100× the second-level blacklisting threshold).

Figure 8:
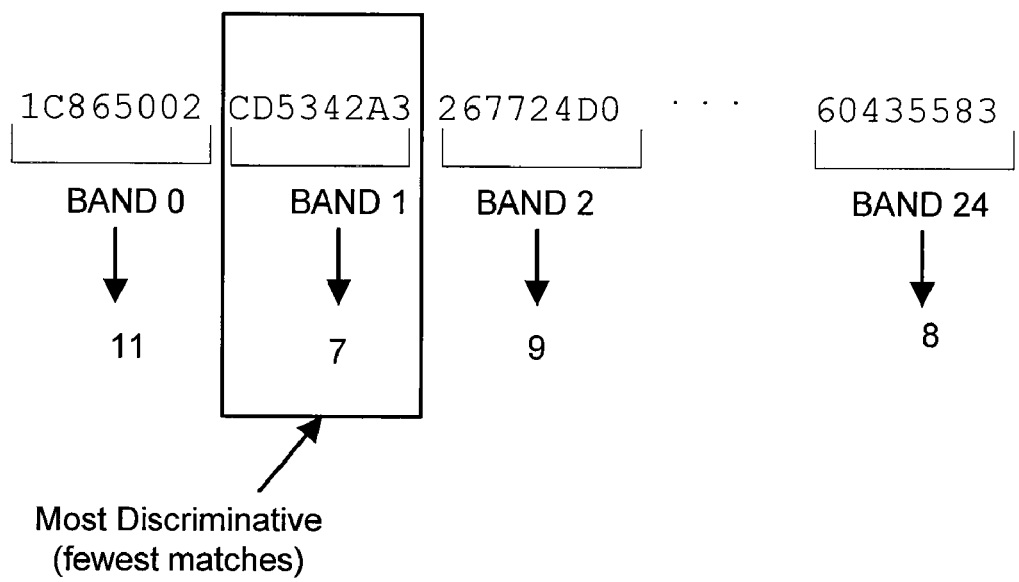
FIG. 8 illustrates an embodiment of a technique for ordering LSH keys in a video sub-fingerprint.
Figure 9:
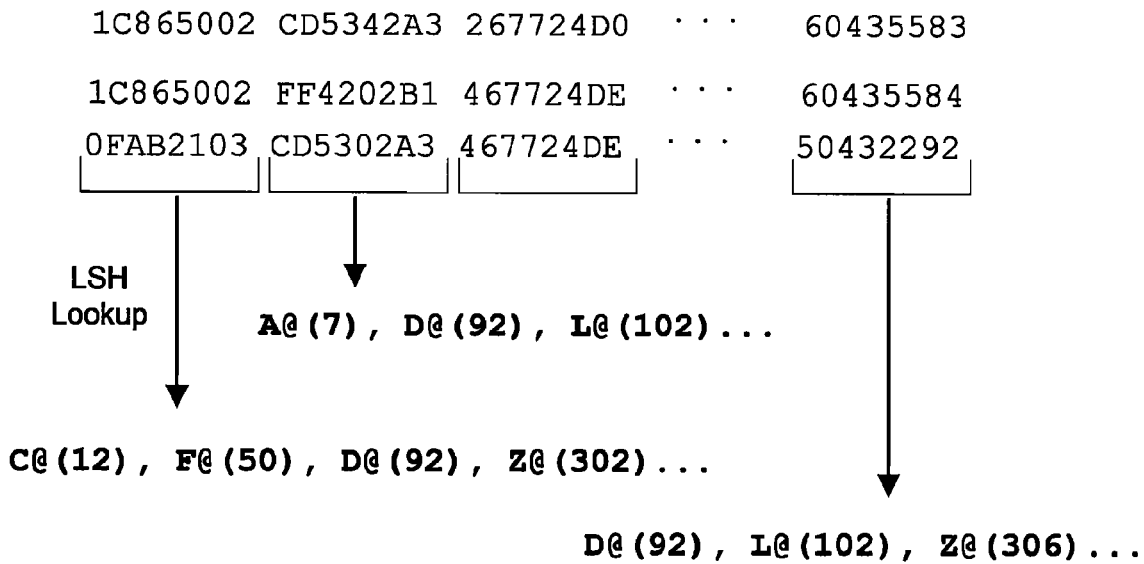
FIG. 9 illustrates an embodiment of an LSH lookup technique for an ordered set of input video sub-fingerprints.

Once the set of input video sub-fingerprints are ordered for the current chunk, the sub-fingerprints are processed beginning with the most discriminative sub-fingerprint (fewest matches). Processing each sub-fingerprint starts from a map of candidates that is empty, except for the pre-population of the initial candidate videos into the top level of the map. Within each sub-fingerprint, the LSH keys are also ordered 410 in a most-to-least-discriminative order, similar to what was done above for sub-fingerprint ordering. For example, as illustrated in FIG. 8, the number of matching reference sub-fingerprint candidates is determined for each LSH key in the sub-fingerprint. The keys are then processed in order beginning with the key having the fewest matches (most discriminative). Using this ordering of LSH keys, the process begins with the first LSH key and adds reference sub-fingerprint candidates having a matching key to a candidate map. For example, as illustrated in FIG. 9 an LSH lookup is performed on the ordered input video sub-fingerprints (and in order of the LSH keys within each sub-fingerprint). As each lookup is performed, the resulting sub-fingerprint identifiers are stored. In one embodiment, candidates (corresponding to reference sub-fingerprints) are added to the candidate map according to the following restrictions:

(1) The candidate is from the initial candidate video list. This check can be done implicitly by the map pre-population step mentioned above. If the video identifier is in the pre-population map, it is in the initial candidate list and the process can proceed. If that position is not in the map, the candidate match is not recorded.

(2) The number of different candidates in the map does not exceed a pre-defined threshold. Once it reaches that threshold, subsequent LSH keys can increase support for existing candidates but can not add new candidates. Again, an exception can be made for premium-content candidates.

(3) There is at least (t-1) remaining (unseen from this sub-fingerprint) LSH chunks for new candidates to be allowed, where t is the LSH-sub-fingerprint threshold (described below). This count of remaining LSH chunks includes the LSH chunks that were subject to second-level blacklisting but not those subject to first-level blacklisting.

(4) The LSH chunks that were subject to second-level blacklisting are considered last and create a seen-occurrence-count for each video, but summing across blacklisted chunks for each candidate video.

Figure 10:
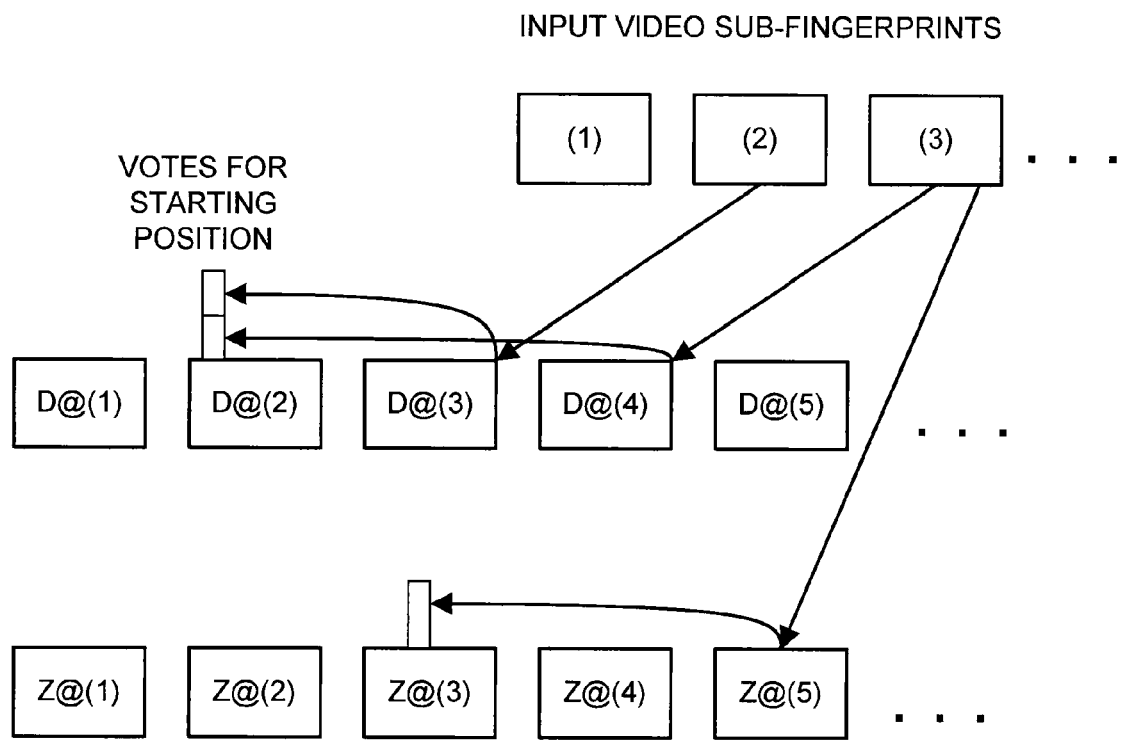
FIG. 10 illustrates an embodiment of a mapping of between input video sub-fingerprints and reference video sub-fingerprints for determining matches.
Figure 11:
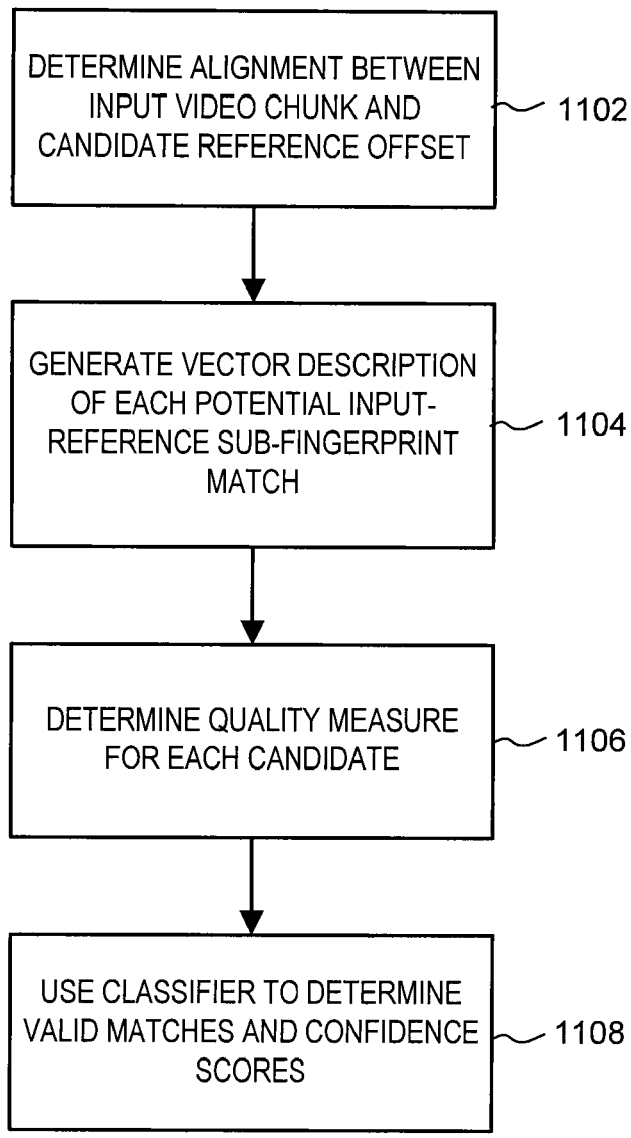
FIG. 11 is an embodiment of a process for classifying a reference video segment as a matching or non-matching segment.

The resulting candidate map has a limited list of reference sub-fingerprint identifiers from the initial candidate video list and offsets that match the current input subfingerprint. The next step combines candidates across input video sub-fingerprints to determine which reference and offset candidate is supported by the input sub-fingerprints. Each match between a sub-fingerprint of the input video and a reference sub-fingerprint candidate "votes" for a particular starting position of the match between the input video and the reference video. The starting position is determined by subtracting the offset into the input video from the matching position in the reference video. For example, as illustrated in FIG. 10, the input video sub-fingerprint at an offset (2) has a match with a reference sub-fingerprint D@(3). This generates a "vote" for a starting position D@(2). Similarly, a sub-fingerprint at an offset (3) of the input video has a match with the reference sub-fingerprint D@(4). This match also votes for the starting position D@(2). In general, if a sub-fingerprint at an offset X in the input video has a match with an offset Y in a reference video, this supports that the inference that the start of the input video matches a position in the reference video of Y−X+1. Votes are accumulated across sub-fingerprints for each reference video. The result is, in effect, a Hough transform for unit-slope lines, giving the input video-reference timing of possible matches.

The votes are similarly processed for each sub-fingerprint in the input video. In one embodiment, the reference offsets that have at least t votes for the starting position are transferred to a new candidate map that holds the candidate support for the current input video chunk. This threshold can be selectively lowered for premium content. For example, candidates that involve premium content could transfer to the new candidate map even for lower support levels than non-premium content. This threshold will be higher for the input sub-fingerprints that generated too many reference candidates with support of t or more votes. On each input sub-fingerprint, the threshold is adjusted upwards until the number of candidates from that sub-fingerprint that will pass is less than a predefined number. For example, in one embodiment, 400,000 candidate pairs are allowed with each candidate pair corresponding to a unique match reference or starting offset for each 10 seconds of input video. However, the specific maximum number of candidates that is used is highly dependent on the computational and timing constraints of the system. The passing candidates are transferred into the new candidate map for the current input video chunk by adding their support to the previous support (from previously considered input sub-fingerprints within the current input video chunk).

Once all the sub-fingerprints for the current chunk are examined, the maps for the current, previous, and following chunks are added together, giving the most weight to the evidence from the current chunk's map but allowing the other two chunk maps to add candidates or increase the support for an existing candidate. From this combined map, the process uses smeared peak picking (and non-maximal suppression) on that map to create a list of (video, offset) candidates that will be considered in the second stage. Smeared peak picking is a simple convolution over the offsets for the starting times within a single candidate. An example embodiment includes convolving by a triangular window with the triangle width being twice the maximum expected time dispersion for possible changes to the tempo of playback. For example, to support up to 10% speed up or slow down in the video playback with a chunk size of 10 seconds, then the full triangle width would be 2 seconds. The convolution process will increase the height of the peaks where there is support for nearby starting-time offsets. Non-maximal suppression is the process of forcing the peaks that are selected as final candidates for this stage to belong to distinctive maximal lobes of this smeared time signal. This process starts by locating the highest maxima in the signal and recording that location (and value). The process then zero out the values that are closer than a certain time interval to that maximum (e.g., 5 sec separation when using 10 sec chunks). The zeroing process continues outward forward and backward in time for as far as the original (smeared) function continued to monotonically decrease. Using smeared peak picking/non-maximal suppression effectively provides the functionality of the more general slope-and-intercept Hough transform without requiring the extra memory that such a two-dimensional transform would require. The output of stage 1 is a limited list of candidate video segments (each corresponding to a reference sub-fingerprint) that will be further considered to determine a matching portion between the input video and a reference video. The limit set for this is also highly system dependent but can typically be well below 1000 candidate matches per 10 second input chunk.

Stage 2: Candidate Evaluation

The second stage processing considers the candidate video segments found by the first stage and determines whether or not some, all, or none are valid matches. Since the process allows for the possibility of duplicates (full or partial) in the reference set, a more general description is provided (instead of a single yes-/no-match decision per probe chunk). The second stage processing can handle a wide range of media, from non-descript portions that has spurious matches to many different files to timing-sensitive portions that poorly match even the same reference material, when it is slightly shifted in time.

To handle this task and this range of material, the classification process starts by creating a match quality measure for each candidate video segment. In one embodiment, dynamic time warping (DTW) determines 1102 the best alignment across time between the current input video chunk and the reference videos. The parameters of the DTW are determined by the amount of time distortion within the matching media that the application must support (e.g., for many applications about 15% time speed up or slow down). From the output of the DTW, pairings are determined between individual sub-fingerprints of the input video and the reference sub-fingerprints. The set of pairings are evaluated to generate 1104 a vector description of the match between the input video and the reference video. Examples of possible entries into that match vector could be:

1) The accumulated Hamming distance between the paired sub-fingerprint vectors.
2) The percentage of sub-fingerprints for which at least 80% of the paired vectors matched.
3) The percentage of sub-fingerprints for which at least 60% of the paired vectors matched.
4) The percentage of sub-fingerprints for which at least 40% of the paired vectors matched.
5) The percentage of sub-fingerprints for which at least 20% of the paired vectors matched.
6) The Mean Squared Error (MSE) between the decode path and a Least Squared Error (LSE)-fit straight-line decode path.
7) The slope of the LSE-fit straight-line decode path.
8) The number of valid sub-fingerprints that were paired with valid sub-fingerprints and at least 10% of the paired vectors matching, where valid/invalid is determined using some measure taken during the front-end fingerprinting process (e.g., non-blank or non-silent).
9) The number of invalid sub-fingerprints that were paired with invalid sub-fingerprints.
10) The number of invalid sub-fingerprints that were paired with sub-fingerprints.
11) The number of neighboring probe chunks that had the same video and approximately the same offset listed in their first-stage candidate list.
12) The number of votes that this pairing received during the first stage collection of evidence.
13) The presence of, confidence in, and timing and offset similarity in matches with this reference on previously examined channels.
14) The designation of a reference as premium.
15) The upload history of the user who has generated this probe (e.g., has this user has previously uploaded content from the reference set).
16) If metadata is available about both probe and reference content, the similarity between those descriptions (e.g., anchor text).

From this vector description, a quality measure is determined 1106. One example of a quality measure uses a likelihood ratio between a model for true matches and a model for false matches. Appropriate models could be full-covariance Gaussian models or diagonal-variance Gaussian mixture models, among others. Alternately, this quality measure step 1106 may be bypassed by simply setting all quality measures to zero.

Optionally, once the quality measure is computed for all of the first-stage candidates for the current chunk, population statistics can be used on this set to help differentiate between non-descript segments and time-offset-sensitive segments. This can be done by assuming that the spread of quality measures from the first-stage candidate list will be different between these two. For example, it might be that non-descript content have many candidate pairings that match to some (above-threshold) extent while distinctive, time-sensitive content has only a single candidate pair that matches well on some axes (e.g., linearity of the decoding path) but not on others. Some degree of support for this type of distinction can be provided by extending the match-pairing description with population normalized entries. These can include:

1) The quality measure for the pairing (without normalization).
2) The rank of the pairing, where ranking uses the quality measures of the candidate matches for the probe chunk.
3) The mean quality measure for the candidate matches for the probe chunk.
4) The standard deviation for the candidate matches for the probe chunk.
5) The inverse standard deviation for the candidate matches for the probe chunk.
6) The pairing's quality measure normalized by the mean and standard deviation for the quality measures on the candidates for the probe chunk.
7) The pairing's rank normalized by the mean and standard deviation for the quality measures on the candidates for the probe chunk.

This step may also be omitted by setting the additional entries to zero.

This extended match-pairing description is then provided as input to a classifier of true/false match pairings. The classifier is used 1108 to classify candidates as valid or invalid matches and provide confidence scores for the matches. The classifier can be any of a wide variety of forms, whether based on neural-network-like structures or based on linear classifiers. If the classifier indicates acceptance of that pairing it is included in the list provided to the third stage, along with a confidence score. Otherwise, it is omitted. The output of this stage is a list of valid matching candidates.

Stage 3: Candidate Combination and Pruning

For some content, there are a large number of candidates that pass the second stage tests, many that include overlapping content. Instead of listing each of these separately or completely omitting those that are beyond some length restriction on the final candidate list, one embodiment reduces the candidate list to something that is both more concise and more reliable.

Figure 12:
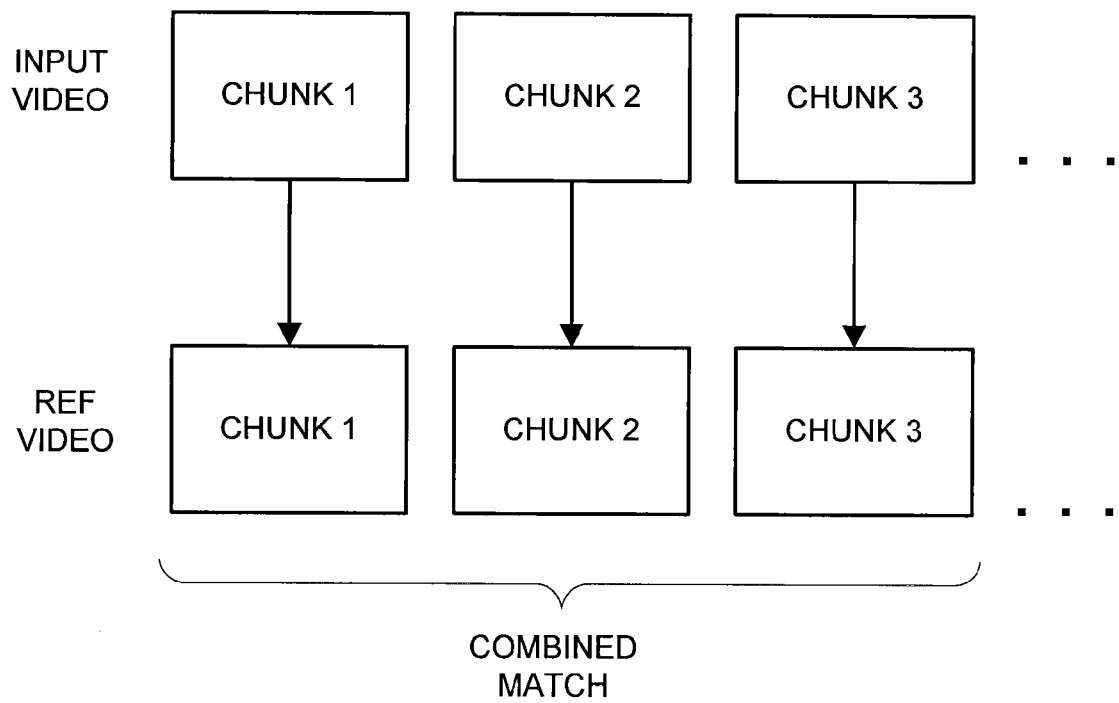
FIG. 12 is an embodiment of a technique for matching time-localized chunks of an input video and a reference video across time.

This is done by collecting reference video portions that match different input video chunks and combining these components into a single combined match. For example, as illustrated in FIG. 12, component matches (chunk 1, chunk 2, chunk 3) between the input video and the reference video are combined into a combined match. To pass out of the pruning stage, constraints could be imposed such as, for example:

1) At least 2 different input video chunks provide support for a combined match (where any signal pairing between an input video chunk and a portion of the reference video can support only one combined match).
2) The average match quality for the combined match is above some threshold.
3) The variance between the input video and the reference portions across the chunks supporting the combined match is less than some threshold.

One approach to doing this match grouping process is a greedy algorithm where all component matches that are within certain time-location limits are put into a supporting list. If that full length list shows too much variance in the offset between the input video and the reference video across component chunks, then an outlier (in the offset) is omitted from that match and the set is considered again either until the set is of length 2 or less or until the combined match passes its tests. If the combined match passes its tests, then all of the component matches that provide support for that combined match are flagged as matching content. In addition, other matches that are in the "shadow" of the combined match are determined to include matching content, where the shadow of the combined match are those matching portions that have similar time supports between the input video and the same reference video and have a similar time offset between the two. Examples of when shadowing will happen is when there is a long unchanging time in video and there is a gap between matching portions. If the combined match does not pass its tests, then the component match that was used as a seed for the proposed combined match is omitted. The combination process is then repeated on the reduced unclaimed list until that list is empty.

One embodiment of the final stage process is configured to avoid matching generic low-motion sequences of a similar type. An example of this problem is the "talking head" video. The video track is clear and often crisp but many conventional fingerprinting methods are unable to distinguish between video content of a dark background, a dark suit, with a light-color face near the center. For example, the video track of a press conference by a first subject, "George" may appear similar to all other press conferences by George (to the level of detail that many fingerprint-generation processes use) and could easily look very much like any press conference by a second subject, "Bill." Thus, conventional fingerprinting may undesirably indicate a match between these videos. These incorrect matches of the video channel will tend to generate many shadowed matches and will not be accompanied by a corresponding match between the audio channel. So, to avoid reporting these incorrect matches, on those matches that do not cover both channels and have more than some ratio threshold of shadowed-to-supporting matches, the process can lower the confidence in that match or, if the confidence would be too low, remove the match altogether. In this way, a small number of matches with multiple-chunk support is created and returned from the full process.

Match Results

The final output provides a list of reference videos (or identified portions of reference videos) that have been determined to match the input video (or a portion of the input video). This determination can be used for several purposes. First, if the matching module 108 determines that an uploaded input video 102 is a duplicate of a video already in the reference video set, the uploaded input video 102 can be discarded in order to save storage space. Second, the input video 102 can be used to probe the reference videos for video content that is, for example, copyright protected. Then these videos can be flagged or removed from the reference video set. Advantageously, the described system and method are able to efficiently and accurately detect matches even under tight time constraints and/or using a limited amount of memory.

Additional Alternative Embodiments

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for detecting duplicate video content, the method comprising:
    storing in a database, reference fingerprints for a plurality of reference videos, wherein a given reference video has a plurality of reference video segments corresponding to time-localized portions of the given reference video, and wherein the reference fingerprint for the given reference video comprises a plurality of reference sub-fingerprints derived from the plurality of reference video segments;
    receiving at a processor, an input fingerprint representing an input video;
    selecting by the processor, a subset of the plurality of reference video segments as candidate segments, the candidate segments selected by the processor for having reference sub-fingerprints that at least partially match the input fingerprint;

classifying by the processor, each of the candidate segments as either a matching candidate segment or a non-matching candidate segment using a machine-learned classifier; and identifying by the processor, a matching reference video from the plurality of reference videos based on the matching candidate segments.

2. The method of claim 1, further comprising:
obtaining a set of input sub-fingerprints for the input fingerprint, wherein each input sub-fingerprint comprises a sequence of input sub-fingerprint keys;
obtaining sets of reference sub-fingerprints for the reference videos, wherein each reference sub-fingerprint comprises a sequence of reference sub-fingerprint keys; and
selecting the subset of candidate segments based on matches between the reference sub-fingerprint keys and the input sub-fingerprint keys.

3. The method of claim 1, further comprising:
determining a figure of merit for each of the plurality of reference videos based on time-localized matches between the reference videos and the input video; and
selecting the subset of candidate segments based on the figure of merit.

4. The method of claim 1, further comprising:
sorting reference sub-fingerprints representing the reference videos in a sort order from most discriminative to least discriminative; and
selecting the subset of candidate segments based at least in part on the sort order of the reference sub-fingerprints.

5. The method of claim 1, further comprising:
sorting reference keys of reference sub-fingerprints representing a reference video in a sort order from most discriminative to least discriminative; and
selecting the subset of candidate segments based at least in part on the sort order of the reference keys.

6. The method of claim 1, further comprising:
arranging sub-fingerprints of the input fingerprint in a temporally consecutive order;
determining temporally consecutive matches between the input video sub-fingerprints representing the input video and the reference video sub-fingerprints representing the reference video; and
selecting the subset of candidate segments based on the temporally consecutive matches.

7. The method of claim 1, wherein classifying each of the candidate segments comprises:
determining a quality measure indicating a match quality between the input fingerprint and a reference fingerprint for the candidate segment based on a known matching model; and
classifying the candidate segment as a matching segment or a non-matching segment based on the quality measure.

8. The method of claim 1, further comprising:
receiving an input key representing a portion of values from the input fingerprint; and
querying a reverse index table to obtain one or more sub-fingerprint identifiers identifying a time-localized segment of a reference video from the reference video set having a key matching the input key.

9. The method of claim 8, wherein the input key comprises adjacent values from an input sub-fingerprint.

10. The method of claim 8, wherein the input key comprises non-adjacent values from an input sub-fingerprint.

11. The method of claim 8, wherein the reverse index table stores a first level blacklist identifier code in association with a first reference key responsive to more than a predefined percentage of reference sub-fingerprints representing the reference videos containing the first reference key.

12. The method of claim 8, wherein the reverse index table stores a second level blacklist identifier code in association with a first reference key responsive to more than a predefined number of reference sub-fingerprints representing the reference videos containing the first reference key.

13. The method of claim 1, wherein selecting the subset of candidate segments comprises:
identifying premium reference videos labeled as having premium content from the plurality of reference videos; and
selecting the subset of candidate segments based on the identification of the premium reference videos.

14. A non-transitory computer readable storage medium storing computer executable code for detecting duplicate video content, the computer executable program code when executed cause an application to perform steps of:
storing in a database, reference fingerprints for a plurality of reference videos, wherein a given reference video has a plurality of reference video segments corresponding to time-localized portions of the given reference video, and wherein the reference fingerprint for the given reference video comprises a plurality of reference sub-fingerprints derived from the plurality of reference video segments;
receiving an input fingerprint representing an input video;
selecting a subset of the plurality of reference video segments as candidate segments, the candidate segments selected by the processor for having reference sub-fingerprints that at least partially matching the input fingerprint;
classifying each of the candidate segments as either a matching candidate segment or a non-matching candidate segment using a machine-learned classifier; and
identifying a matching reference video from the reference video set based on the matching candidate segments.

15. The non-transitory computer readable storage medium of claim 14, further comprising:
obtaining a set of input sub-fingerprints for the input fingerprint, wherein each input sub-fingerprint comprises a sequence of input sub-fingerprint keys;
obtaining sets of reference sub-fingerprints for the reference videos, wherein each reference sub-fingerprint comprises a sequence of reference sub-fingerprint keys; and
selecting the subset of initial candidate segments based on matches between the reference sub-fingerprint keys and the input sub-fingerprint keys.

16. The non-transitory computer readable storage medium of claim 14, further comprising:
determining a figure of merit for each of the plurality of reference videos based on time-localized matches between the reference videos and the input video; and
selecting the subset of candidate segments based on the figure of merit.

17. The non-transitory computer readable storage medium of claim 14, further comprising:
sorting reference sub-fingerprints representing the reference videos in a sort order from most discriminative to least discriminative; and
selecting the subset of candidate segments based at least in part on the sort order of the reference keys.

18. The non-transitory computer readable storage medium of claim 14, further comprising:
   sorting reference keys of a reference sub-fingerprints representing a reference video in a sort order from most discriminative to least discriminative; and
   selecting the subset of candidate segments based on the temporally consecutive matches.

19. The non-transitory computer readable storage medium of claim 14, further comprising:
   arranging sub-fingerprints of the input fingerprint in a temporally consecutive order;
   determining temporally consecutive matches between the input video sub-fingerprints representing the input video and the reference video sub-fingerprints representing the reference video; and
   selecting the subset of candidate segments based on the temporally consecutive matches.

20. The non-transitory computer readable storage medium of claim 14, wherein classifying each of the candidate segments comprises:
   determining a quality measure indicating a match quality between the input fingerprint and a reference fingerprint for the candidate segment based on a known matching model; and
   classifying the candidate segment as a matching segment or a non-matching segment based on the quality measure.

21. The non-transitory computer readable storage medium of claim 14, further comprising:
   receiving an input key representing a portion of values from the input fingerprint; and
   querying a reverse index table to obtain one or more sub-fingerprint identifiers identifying a time-localized segment of a reference video from the reference video set having a key matching the input key.

22. The non-transitory computer readable storage medium of claim 21, wherein the input key comprises adjacent values from an input sub-fingerprint.

23. The non-transitory computer readable storage medium of claim 21, wherein the input key comprises non-adjacent values from an input sub-fingerprint.

24. The non-transitory computer readable storage medium of claim 21, wherein the reverse index table stores a first level blacklist identifier code in association with a first reference key responsive to more than a predefined percentage of reference sub-fingerprints representing the reference videos containing the first reference key.

25. The non-transitory computer readable storage medium of claim 21, wherein the reverse index table stores a second level blacklist identifier code in association with a first reference key responsive to more than a predefined number of reference sub-fingerprints representing the reference videos containing the first reference key.

26. The non-transitory computer readable storage medium of claim 12, wherein selecting the subset of candidate segments comprises:
   identifying premium reference videos labeled as having premium content from the plurality of reference videos; and
   selecting the subset of candidate segments based on the identification of the premium reference videos.

27. A system for detecting duplicate video content comprising:
   an ingest server for receiving an input video;
   a fingerprinting module for generating an input fingerprint representing the input video;
   a reference database storing reference fingerprints representing a set of reference videos, wherein a given reference video has a plurality of reference video segments corresponding to time-localized portions of the given reference video, and wherein the reference fingerprint for the given reference video comprises a plurality of reference sub-fingerprints derived from the plurality of reference video segments;
   a matching module coupled to the fingerprinting module and the reference database, the matching module for selecting a subset of the plurality of reference video segments as candidate segments, the candidate segments selected by the processor for having reference sub-fingerprints that at least partially matching the input fingerprint, classifying each of the candidate segments as matching segments or non-matching segments, and identifying a matching reference video from the set of reference videos based on the matching candidate segments.

28. The system of claim 27, wherein the reference database comprises:
   a reverse index table storing a mapping between identifiers of the reference videos and reference keys, wherein the reference keys comprise localized sets of values from the reference sub-fingerprints.

29. The system of claim 28, wherein the reverse index table stores a first level blacklist identifier code in association with a first reference key responsive to more than a predefined percentage of the reference sub-fingerprints containing the first reference key.

30. The system of claim 28, wherein the reverse index table stores a second level blacklist identifier code in association with a first reference key responsive to more than a predefined threshold of the reference sub-fingerprints containing the first reference key.

* * * * *